(12) United States Patent
Chen

(10) Patent No.: US 9,569,617 B1
(45) Date of Patent: Feb. 14, 2017

(54) SYSTEMS AND METHODS FOR PREVENTING FALSE POSITIVE MALWARE IDENTIFICATION

(71) Applicant: Symantec Corporation, Mountain View, CA (US)

(72) Inventor: Joseph H. Chen, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 155 days.

(21) Appl. No.: 14/197,877

(22) Filed: Mar. 5, 2014

(51) Int. Cl.
  *G08B 23/00* (2006.01)
  *G06F 21/56* (2013.01)
(52) U.S. Cl.
  CPC ..................... *G06F 21/56* (2013.01)
(58) Field of Classification Search
  CPC .......................................................... G06F 21/56
  See application file for complete search history.

(56) References Cited

U.S. PATENT DOCUMENTS

| | | | |
|---|---|---|---|
| 5,796,924 A | 8/1998 | Errico et al. | |
| 8,561,193 B1* | 10/2013 | Srivastava | G06F 21/563 713/152 |
| 8,627,469 B1* | 1/2014 | Chen | G06F 21/567 726/22 |
| 8,655,883 B1 | 2/2014 | Yuksel | |
| 2002/0099702 A1 | 7/2002 | Oddo | |
| 2004/0249774 A1 | 12/2004 | Caid et al. | |
| 2007/0136455 A1* | 6/2007 | Lee | G06F 21/564 709/223 |
| 2007/0180528 A1* | 8/2007 | Kane | G06F 21/56 726/24 |
| 2007/0185901 A1 | 8/2007 | Gates | |
| 2009/0049549 A1* | 2/2009 | Park | G06F 21/55 726/22 |
| 2010/0058483 A1* | 3/2010 | Haas | G06F 21/6254 726/27 |
| 2010/0077481 A1 | 3/2010 | Polyakov et al. | |
| 2010/0083376 A1* | 4/2010 | Pereira | G06F 21/562 726/22 |
| 2011/0047618 A1* | 2/2011 | Evans | G06F 21/566 726/23 |
| 2011/0107424 A1 | 5/2011 | Singh et al. | |

(Continued)

OTHER PUBLICATIONS

Satish, Sourabh, "Behavioral Security: 10 steps forward 5 steps backward", DeepSec IDSC 2011, Vienna, Austria, (Nov. 15-18, 2011).

(Continued)

*Primary Examiner* — Shewaye Gelagay
*Assistant Examiner* — Khoi Le
(74) *Attorney, Agent, or Firm* — FisherBroyles LLP

(57) ABSTRACT

A computer-implemented method for preventing false positive malware identification may include (1) identifying a set of variants of a trusted software program, (2) characterizing, for each variant in the set of variants of the trusted software program, at least one common property of the variants, (3) clustering the set of variants of the trusted software program based on the common property of the variants, and (4) creating a signature capable of recognizing variants of the trusted software program. Various other methods, systems, and computer-readable media are also disclosed.

20 Claims, 9 Drawing Sheets

(56) References Cited

U.S. PATENT DOCUMENTS

| | | | |
|---|---|---|---|
| 2011/0271341 A1* | 11/2011 | Satish | G06F 21/552 726/23 |
| 2012/0054184 A1 | 3/2012 | Masud et al. | |
| 2013/0239219 A1* | 9/2013 | Siman | G06F 21/577 726/25 |
| 2013/0276114 A1 | 10/2013 | Friedrichs et al. | |
| 2014/0201208 A1 | 7/2014 | Satish et al. | |
| 2014/0207518 A1 | 7/2014 | Kannan et al. | |

OTHER PUBLICATIONS

You, Chao et al., "An Approach to Detect Malicious Behaviors by Evading Stalling Code", TELKOMNIKA, vol. 10, No. 7, (Nov. 2012), pp. 1766-1770.

Sourabh Satish; Systems and Methods for Clustering Data Samples; U.S. Appl. No. 13/780,765, filed Feb. 28, 2013.

Sourabh Satish; Systems and Methods for Predicting Optimum Run Times for Software Samples; U.S. Appl. No. 13/794,720, filed Mar. 11, 2013.

Hu, Xin et al., "MutantX-S: Scalable Malware Clustering Based on Static Features", http://0b4af6cdc2f0c5998459-c0245c5c937c5dedcca3f1764ecc9b2f.r43.cf2.rackcdn.com/11753-atc13-hu.pdf, as accessed Jan. 14, 2014, 2013 USENIX Annual Technical Conference (USENIX ATC '13), USENIX Association, (2013), pp. 187-198.

Wikipedia, "Cluster Analysis", http://en.wikipedia.org/wiki/Data_clustering#Comparison_between_data_clusterings, as accessed on Nov. 29, 2012.

Khorshidpour, Zeinab et al., "An Evolvable-Clustering-Based Algorithm to Learn Distance Function for Supervised Environment", IJCSI International Journal of Computer Science Issues, vol. 7, Issue 5, (Sep. 2010), pp. 374-381.

Barbará, Daniel, "Requirements for Clustering Data Streams", http://www.cs.iastate.edu/~honavar/datastreamcluster.pdf, as accessed Jan. 14, 2014, SIGKDD Explorations, vol. 3, Issue 2, (Jan. 2002), pp. 23-27.

Nguyen, Hai-Long et al., "Concurrent Semi-supervised Learning of Data Streams", http://link.springer.com/chapter/10.1007%2F978-3-642-23544-3_34, as accessed Jan. 14, 2014, Data Warehousing and Knowledge Discovery, 13th International Conference, DaWaK 2011, Lecture Notes in Computer Science vol. 6862, Springer Berlin Heidelberg, Toulouse, France, (Aug. 29-Sep. 2, 2011), pp. 445-459.

Valko, Michal et al., "Online Semi-Supervised Learning on Quantized Graphs", http://arxiv.org/ftp/arxiv/papers/1203/1203.3522.pdf, as accessed Jan. 14, 2014, Proceedings of the Twenty-Sixth Conference on Uncertainty in Artificial Intelligence (UAI2010), AUAI Press, Catalina Island, CA, (Jul. 8-11, 2010).

Goldberg, Andrew B., "OASIS: Online Active Semi-Supervised Learning", http://pages.cs.wisc.edu/~jerryzhu/pub/oasis.pdf, as accessed Jan. 14, 2014, Association for the Advancement of Artificial Intelligence, (2011).

Kholghi, Mahnoosh et al., "Active Learning Framework Combining Semi-Supervised Approach for Data Stream Mining", http://link.springer.com/chapter/10.1007%2F978-3-642-18134-4_38, as accessed Jan. 14, 2014, Intelligent Computing and Information Science, International Conference, ICICIS 2011, Proceedings, Part II, Communications in Computer and Information Science vol. 135, Springer Berlin Heidelberg, Chongqing, China, (Jan. 8-9, 2011), pp. 238-243.

Sourabh Satish; Systems and Methods for Updating Generic File-Classification Definitions; U.S. Appl. No. 14/210,364, filed Mar. 13, 2014.

Sourabh Satish, et al.; Systems and Methods for Clustering Data; U.S. Appl. No. 14/214,581, filed Mar. 14, 2014.

Gonzalez, Teofilo F., "Clustering to Minimize the Maximum Intercluster Distance", https://www.cs.ucsb.edu/~teo/papers/Ktmm.pdf, as accessed Jan. 14, 2014, Theoretical Computer Science 38, North-Holland, Elsevier Science Publishers B.V., (1985), pp. 293-306.

Sourabh Satish; Systems and Methods for Predicting Optimum Run Times for Software Samples; U.S. Appl. No. 15/192,646, filed Jun. 24, 2016.

* cited by examiner

SYSTEMS AND METHODS FOR PREVENTING FALSE POSITIVE MALWARE IDENTIFICATION

BACKGROUND

In recent years, authors of malicious software ("malware") have attempted to proliferate malware by generating thousands or potentially millions of variations of malicious files. For example, unique versions of malware code may be created with each new infection, or the malware program may modify itself each time it propagates to a new computer system, or even every time it runs (so-called "polymorphic malware"). Unfortunately, because many existing antivirus technologies detect malware by detecting or identifying unique digital signatures or fingerprints associated with known-malicious files, malware authors may avoid detection by only distributing new (i.e., unique) or repacked versions of malicious files.

In light of this, some security-software vendors have begun investigating and implementing reputation-based security systems. In a reputation-based security system, a security-software vendor may attempt to determine whether a file represents malware by collecting, aggregating, and analyzing data from potentially millions of user devices within a community, such as the security-software vendor's user base. For example, by determining a file's source, age, and prevalence within the community, among other details, a security-software vendor may gain a fairly accurate understanding as to whether the file represents malware.

Some legitimate software publishers and distributors, however, also distribute many unique variants of a program. For example, a software developer may customize each copy of a program it distributes to personalize the user experience for each customer, or to facilitate detection of unauthorized copying of the software. A software distributor may also repackage freeware or "adware" programs with advertisements uniquely selected for each customer.

Unfortunately, malware detection systems that rely on signature-based detection may not recognize customized versions of a legitimate program as variants of a single program. In addition, reputation-based systems may incorrectly identify unique or similar versions of a program with low prevalence and unknown origin or age as potential polymorphic threats. These mistakes, known as "false positives," may be extremely disruptive and costly for an enterprise since they can result in the deletion or removal of legitimate, and potentially essential, files and software from computing devices within the enterprise. Accordingly, the instant disclosure identifies and addresses a need for additional and improved systems and methods for preventing false-positive malware identification.

SUMMARY

As will be described in greater detail below, the instant disclosure generally relates to systems and methods for preventing false positive malware identification by identifying variants of a trusted program, identifying one or more common properties of the variants, clustering the variants based on the common properties, and creating a signature that may be used to recognize the clustered variants of the trusted program.

In one example, a computer-implemented method for preventing false positive malware identification may include (1) identifying a set of variants of a trusted software program, (2) characterizing, for each variant in the set of variants of the trusted software program, at least one common property of the variants, (3) clustering the set of variants of the trusted software program based on the common property of the variants, and (4) creating a signature capable of recognizing variants of the trusted software program.

In some examples, identifying the set of variants of the software program may include (1) obtaining, from a software distributor, at least one variant in the set of variants of the software program, (2) obtaining, from the software distributor, a description of the common property of the variants of the software program, and/or (3) obtaining, from a community of software users, the set of variants of the software program.

In one embodiment, the common property may include (1) a static code segment, (2) a behavioral property, and/or (3) a pattern of network communication. In some examples, characterizing the common property of each variant of the set of variants of the trusted software program may include analyzing a subset of variants in the set of variants to identify (1) the static code segments present within the subset of variants, (2) the behavioral property of the subset of variants, and/or (3) the pattern of network communication of the subset of variants.

In some examples, clustering the set of variants of the trusted software program may include (1) verifying the presence of the common property in a variant that is in the set of variants, but not in the subset, and (2) ascribing the common property to at least one variant that is in the set of variants, but not in the subset. In some examples, creating a signature based on the common property of the set of variants of the trusted software program may include (1) generating a signature hash capable of identifying variants of the trusted software program, (2) describing a behavioral property capable of identifying variants of the trusted software program, and/or (3) describing a pattern of network communication capable of identifying variants of the trusted software program.

In some examples, the computer-implemented method may further include adding the signature to a database that associates common property signatures with sets of variants of trusted software programs. In addition, the computer-implemented method may include (1) identifying a candidate software program, (2) identifying the trusted software program of which the candidate software program purports to be a variant, (3) querying, using the identification of the trusted software program, the trusted software program database, (4) receiving, in response to querying the trusted software program database, at least one common property signature associated with the trusted software program, and (5) identifying the candidate software program as a variant of the trusted software program by verifying that the common property of the set of variants of the trusted software program on which the common property signature is based is present in the candidate software program.

In one embodiment, the computer-implemented method may further include (1) identifying a candidate software program, (2) identifying a property of the candidate software program, (3) creating a signature based on the property of the candidate software program, (4) querying, using the signature, the trusted software program database, (5) receiving, in response to querying the trusted software program database, at least one common property signature associated with a trusted software program, and (6) identifying the candidate software program as a variant of the trusted software program by verifying that the common property of the set of variants of the trusted software program on which the common property signature is based is present in the candidate software program.

In one embodiment, a system for implementing the above-described method may include (1) an identification module, stored in memory, that identifies a set of variants of a trusted software program, (2) a characterization module, stored in memory, that characterizes, for each variant in the set of variants of the trusted software program, at least one common property of the variants, (3) a clustering module, stored in memory, that clusters the set of variants of the trusted software program based on the common property of the variants, (4) a signature module, stored in memory, that creates, based on the common property of the set of variants of the trusted software program, a signature capable of recognizing variants of the trusted software program, and (5) at least one processor configured to execute the identification module, the characterization module, the clustering module, and the signature module.

In some examples, the above-described method may be encoded as computer-readable instructions on a non-transitory computer-readable medium. For example, a non-transitory computer-readable medium may include one or more computer-executable instructions that, when executed by at least one processor of a computing device, may cause the computing device to (1) identify a set of variants of a trusted software program, (2) characterize, for each variant in the set of variants of the trusted software program, at least one common property of the variants, (3) cluster the set of variants of the trusted software program based on the common property of the variants, and (4) create, based on the common property of the set of variants of the trusted software program, a signature capable of recognizing variants of the trusted software program Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
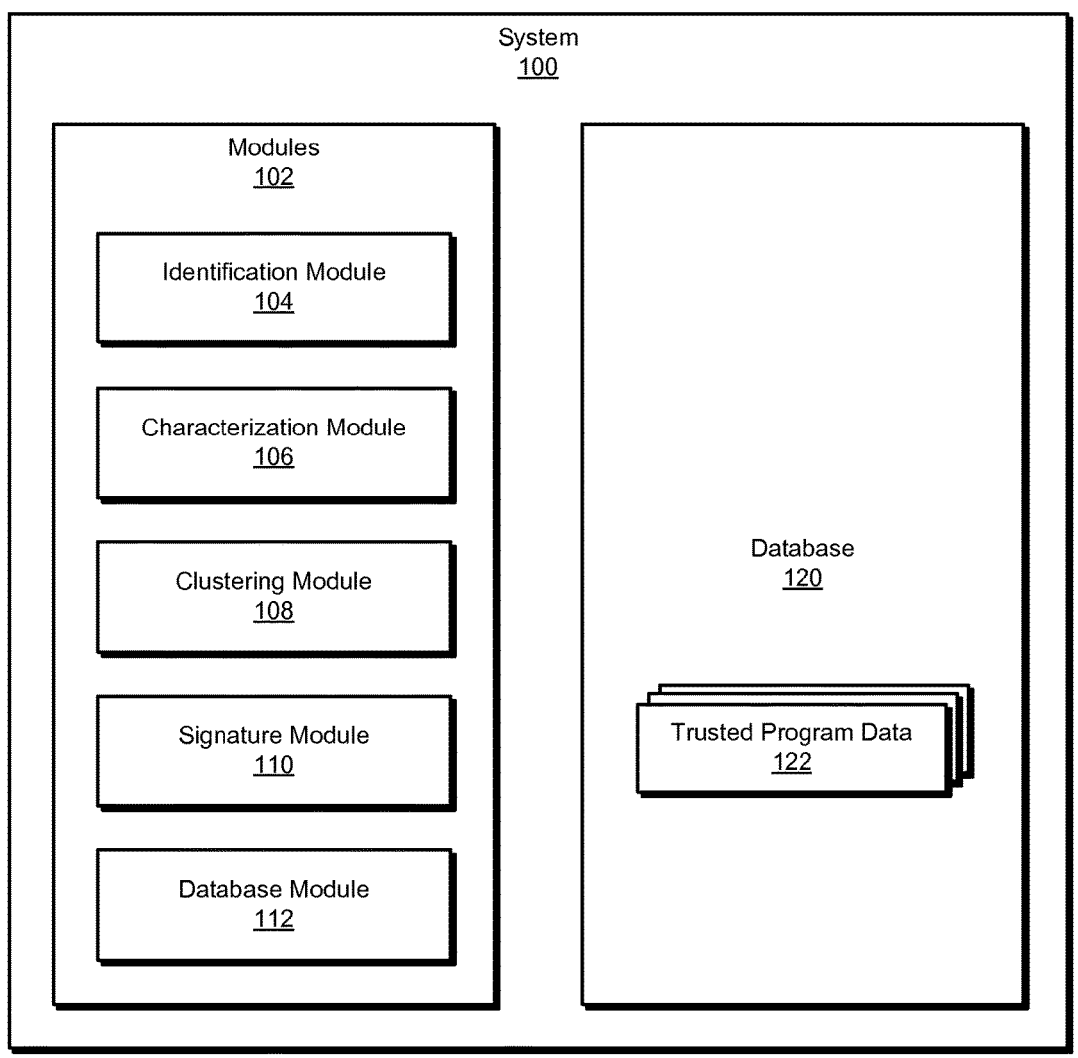
FIG. 1 is a block diagram of an exemplary system for preventing false positive malware identification.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for preventing false positive malware identification. As will be explained in greater detail below, the systems and methods described herein may identify variants of a trusted program to prevent the program from being incorrectly identified as malware or suspected malware, potentially reducing the time and attention required of users or system administrators. In addition, these systems and methods may reduce the number of signatures necessary to provide anti-malware protection, potentially reducing the resources required to differentiate malware from trusted programs.

Figure 2A:
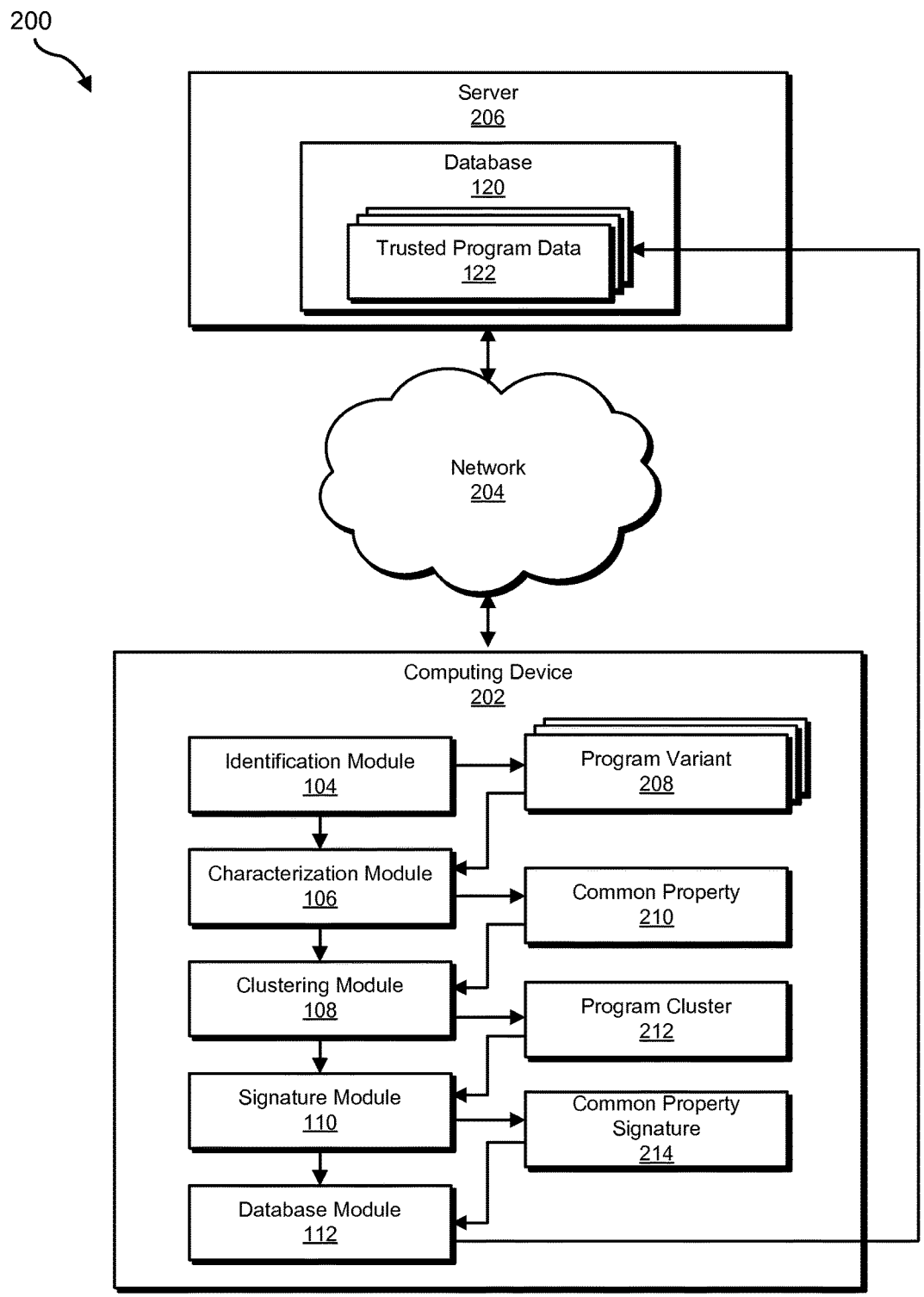
FIGS. 2A and 2B are block diagrams of additional exemplary systems for preventing false positive malware identification.
Figure 2B:
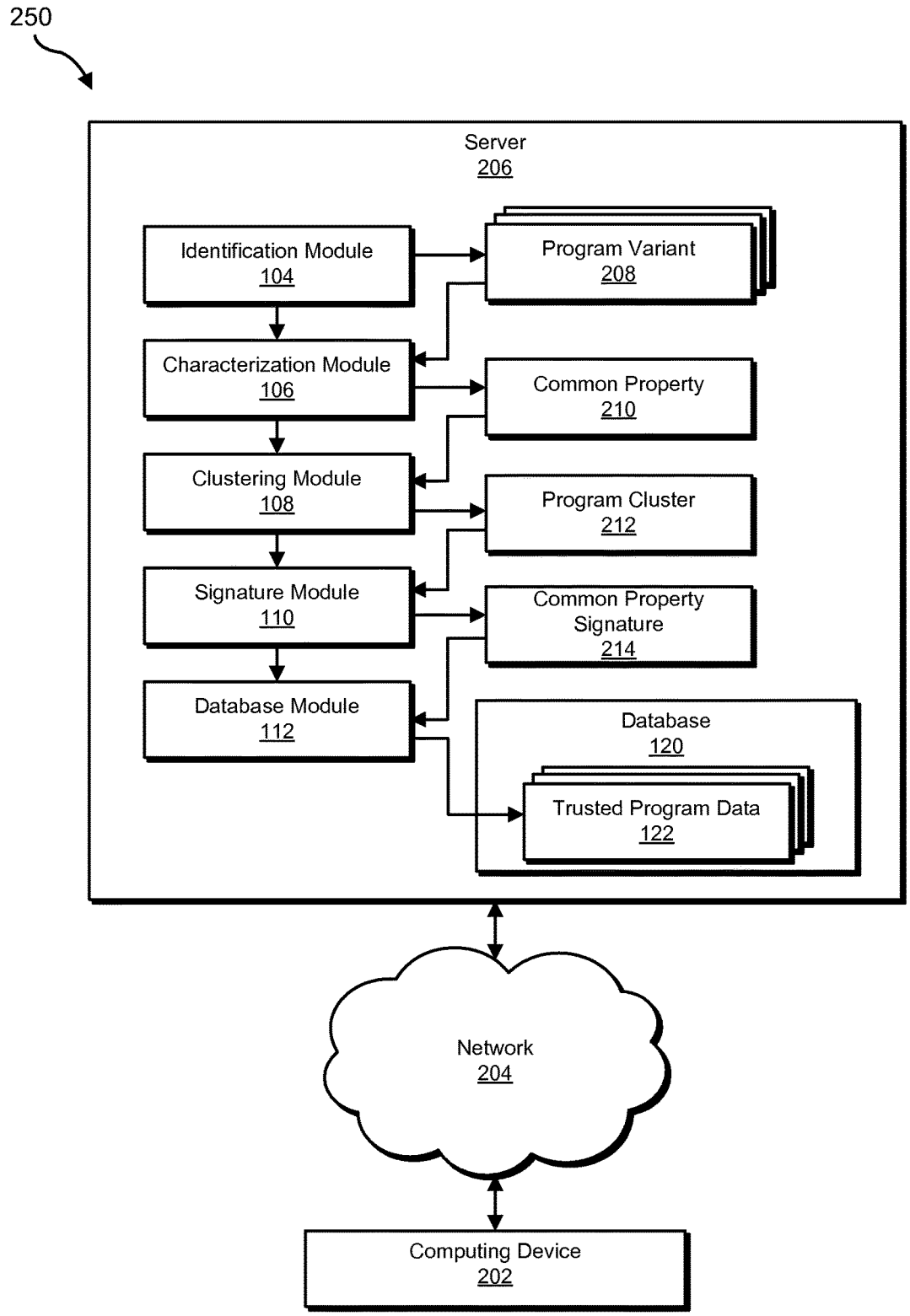

The following will provide, with reference to FIGS. 1-2B, detailed descriptions of exemplary systems for preventing false positive malware identification. Detailed descriptions of corresponding computer-implemented methods will also be provided in connection with FIGS. 3-5B. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for preventing false positive malware identification. As illustrated in this figure, exemplary system 100 may include one or more modules 102 for performing one or more tasks. For example, and as will be explained in greater detail below, exemplary system 100 may include an identification module 104 that may identify a set of variants of a trusted software program. Exemplary system 100 may additionally include a characterization module 106 that may characterize, for each variant in the set of variants of the trusted software program, at least one common property of the variants. Exemplary system 100 may also include a clustering module 108 that may cluster the set of variants of the trusted software program based on the common property of the variants. Exemplary system 100 may additionally include a signature module 110 that may create a signature based on the common property of the set of variants of the trusted software program capable of recognizing variants of the trusted software program. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIGS. 2A-2B (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store trusted program data, which may include signatures capable of recognizing variants of trusted software program.

Database 120 may represent portions of a single database or computing device or a plurality of databases or computing devices. For example, database 120 may represent a portion of server 206 in FIGS. 2A-2B, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIGS. 2A-2B, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2A. As shown in FIG. 2A, system 200 may include a computing device 202 in communication with a server 206 via a network 204. In one example, computing device 202 may be programmed with one or more of modules 102 and/or may store all or a portion of the data in database 120. Additionally or alternatively, as shown in FIG. 2B, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to prevent false positive malware identification. For example, and as will be described in greater detail below, identification module 104 may be programmed to identify a set of program variants 208 of a trusted software program. In addition, characterization module 106 may be programmed to characterize, for each variant in the set of variants of the trusted software program, at least one common property 210 of the variants. Clustering module 108 may be programmed to cluster the set of variants of the trusted software program based on the common property of the variants to create program cluster 212. Finally, signature module 110 may be programmed to create a common property signature 214 capable of recognizing variants of the trusted software program.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of storing, comparing, and/or providing data. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
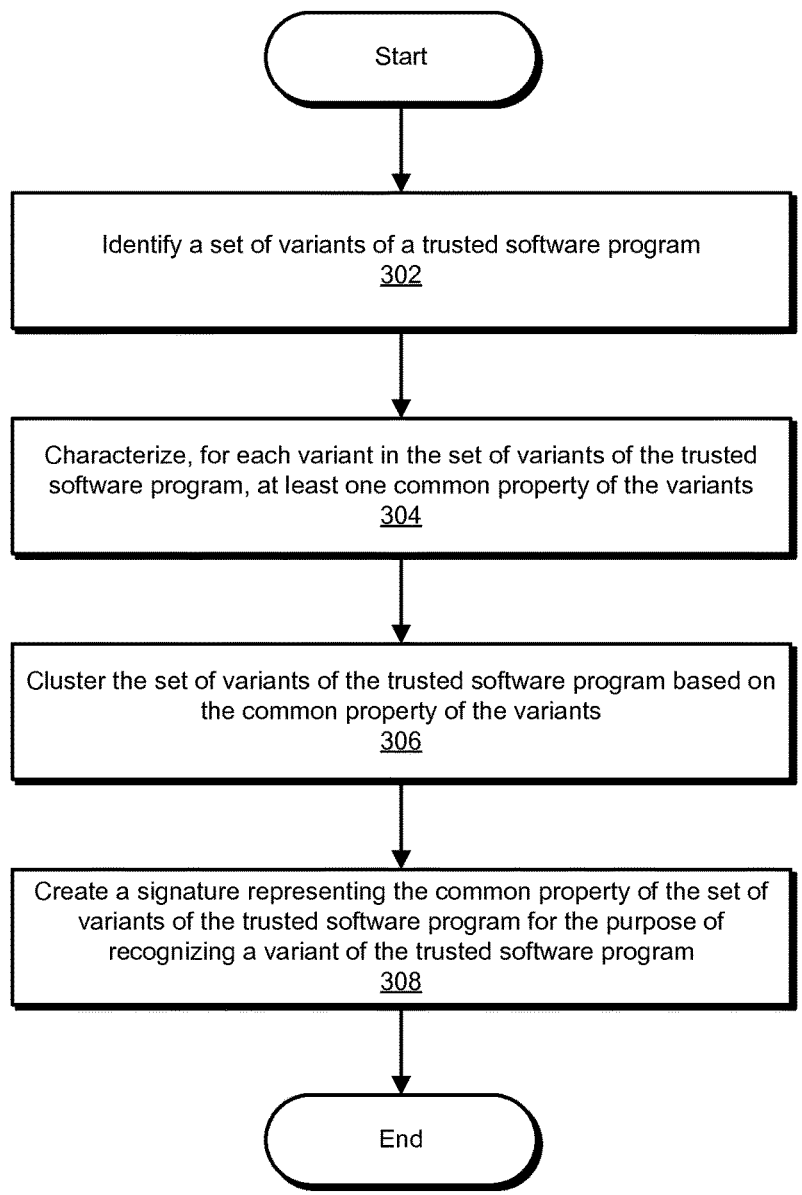
FIG. 3 is a flow diagram of an exemplary method for preventing false positive malware identification.

FIG. 3 is a flow diagram of an exemplary computer-implemented method 300 for preventing false positive malware identification. The steps shown in FIG. 3 may be performed by any suitable computer-executable code and/or computing system. In some embodiments, the steps shown in FIG. 3 may be performed by one or more of the components of system 100 in FIG. 1, system 200 in FIGS. 2A-2B, computing system 610 in FIG. 6, and/or portions of exemplary network architecture 700 in FIG. 7.

As illustrated in FIG. 3, at step 302 one or more of the systems described herein may identify a set of variants of a trusted software program. For example, identification module 104 may, as part of computing device 202 and/or server 206 in FIGS. 2A-2B, identify a set of program variants 208 of a trusted software program.

The phrase "trusted software program," as used herein, generally refers to a software program obtained from a reputable source and/or whose origin and/or integrity has been verified. For example, a software program obtained directly from a software publisher or authorized distributor with an established reputation may be considered a trusted software program. Similarly, a software program that has been digitally signed by a code signing certificate by a trusted entity may considered a trusted software program.

In addition, the term "program variant," as used herein, generally refers to versions of a software program that differ in some respect from one another, but originate from the same code base, and are substantially identical in function. Program variants may, for example, have unique splash screens for each customer, embedded strings identifying the purchaser or licensee of the program, or segments of custom-developed code, and/or be designed specifically for each customer's computing infrastructure.

Identification module 104 may identify a set of variants of a software program in any suitable manner. For example, identification module 104 may obtain one or more variants of a software program from a software publisher or authorized distributor. In this example, identification module 104 may employ various measures for securely acquiring the program variants and/or verifying the integrity of the software program files received. For example, identification module 104 may retrieve the program variants from a network location controlled by a software publisher or distributor and/or protected by a password or other security measures.

In addition, and as mentioned previously, identification module 104 may use code signing certificates to verify both that the program files originated from a software publisher identified in the certificate and that the program has not been modified since it was digitally signed by the software publisher. As used herein, the phrase "code signing certificate" generally refers to any electronic document that is embedded in a software file and is used (e.g., with public key cryptography) to create a digital signature that binds a public key to the identity of a software publisher. Code signing certificates may be issued by a certificate authority that verifies the identity of the software publisher. Software publishers may also create their own code signing certificates. For example, a publisher may submit a public key to a certificate authority and retain a private key to be used in encryption. Software users may then obtain the public key, either from the publisher or the certificate authority, to verify that a code signing certificate originated from the software publisher. In some examples, certificate authorities may issue digital certificates for purposes other than code signing. However, a code signing certificate may contain fields indicating that the certificate is to be used only in code signing.

In another example, identification module 104 may obtain a description of the common property of the variants of the software program from a software developer or publisher. For example, a software developer or publisher may identify strings or code segments common to variants of the software program, and possibly including variants not yet created or released. Additionally or alternatively, a software developer or publisher may identify behavioral or network usage attributes of program variants. In another example, a software developer or publisher may generate and provide the signatures to be used in identifying variants of the software program.

In another example, identification module 104 may obtain a set of variants of a software program from a community of software users. Because obtaining program files from users may introduce points of security failure versus obtaining the program files directly from the software publisher, identification module 104 may take measures to assure the identity and reputation of the users providing the software files. For example, identification module 104 may use code analysis or behavioral testing tools to assure that the set of program variants does not include malware.

Returning to FIG. 3, at step 304 one or more of the systems described herein may characterize, for each variant in the set of variants of the trusted software program, at least one common property of the variants. For example, at step 304 characterization module 106 may, as part of computing device 202 and/or server 206 in FIGS. 2A-2B, characterize, for each variant in the set of program variants 208 of the trusted software program, at least one common property 210 of the program variants 208.

Characterization module 106 may characterize the variants in the set of program variants in a variety of ways. For example, characterization module 106 may identify and describe one or more properties common to variants of the software program, such as static code segments, behavioral properties, and/or patterns of network communication. Characterization module 106 may also limit or expand on common properties identified by identification module 104 at step 302 of FIG. 3 in order to more accurately distinguish program variants from other software programs and/or to simplify the process (and thereby decrease the time required) to identify program variants. Since speed and accuracy of identification may represent conflicting goals, characterization module 106 may be configurable to favor either speed or accuracy.

In some examples, characterization module 106 may characterize the common property of each variant of the set of variants of the trusted software program by analyzing a subset of variants in the set of variants to identify common properties of the variant subset, such as those mentioned previously (namely, static strings or code segments, behavioral properties, and/or patterns of network communication). Since a set of program variants may include thousands of program files, analyzing a subset of the variant files may significantly reduce the time required to characterize the common properties of the variants.

Figure 4:
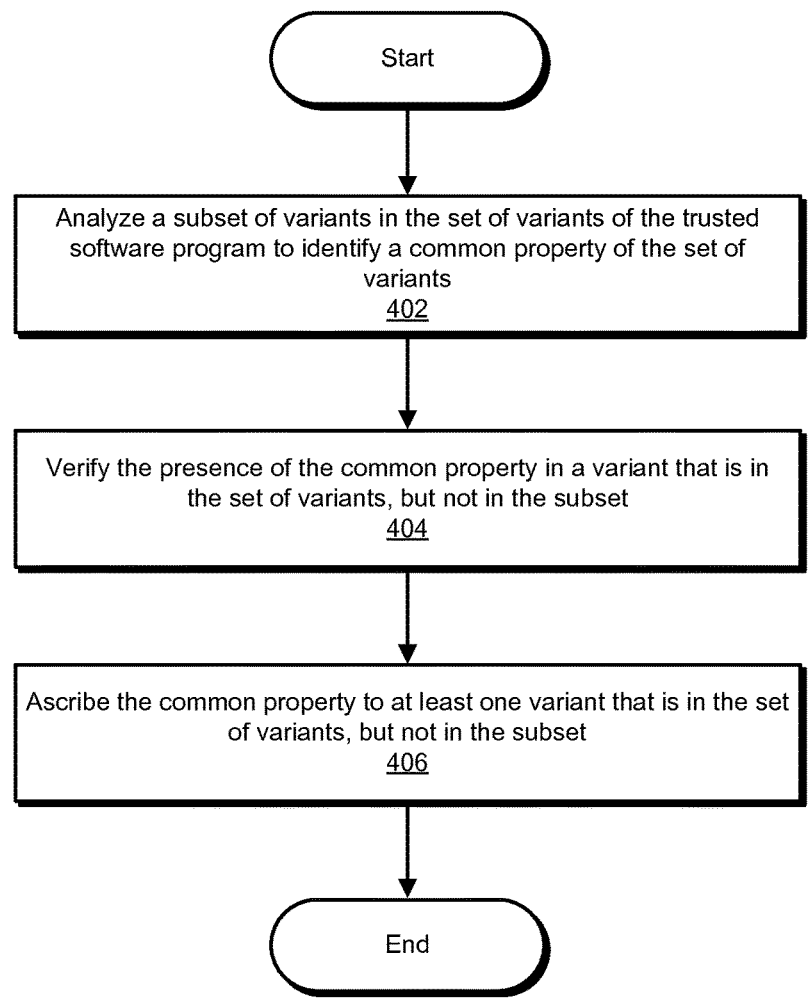
FIG. 4 is a flow diagram of an exemplary method for inferentially characterizing and clustering program variants.

Characterizing variants of a software program by analyzing a subset of the variants may be the first step of an inferential method of characterizing and clustering software program variants. FIG. 4 depicts one embodiment of a method 400 for inferentially characterizing and clustering program variants that may be performed in accordance with steps 304 and 306 of FIG. 3. At step 402 of FIG. 4, characterization module 106 may analyze a subset of variants in the set of variants of the trusted software program to identify a common property of the set of variants. Subsequent steps of method 400 may be performed by clustering module 108, as described in detail below.

Returning to FIG. 3, at step 306 one or more of the systems described herein may cluster the set of variants of the trusted software program based on the common property of the variants. For example, at step 306 clustering module 108 may, as part of computing device 202 and/or server in FIGS. 2A-2B, cluster the set of program variants 208 of the trusted software program based on the common property 210 of the variants, as characterized by characterization module 106, to create program cluster 212.

Clustering module 108 may cluster the set of variants of the trusted software program in a variety of ways. For example, clustering module 108 may cluster the set of program variants by verifying that the common property is present in each variant of the set of program variants. In other examples, clustering module 108 may cluster the set of variants of the trusted software program by inferentially characterizing and clustering the program variants, as shown in FIG. 4. For example, at step 404 of FIG. 4, clustering module 108 may verify the presence of the common property (which may have been identified by characterization module 106 in step 402) in a variant that is in the set of variants, but not in the subset. At step 406, clustering module 108 may inferentially cluster variants of the software program by ascribing the common property to at least one variant that is in the set of program variants, but not in the subset. In some examples, clustering module 108 may verify the accuracy of the clustering process by verifying that the common property is present in the variant not in the subset, or in a randomly-selected sample of program variants not included in the subset.

Returning to FIG. 3, at step 308 one or more of the systems described herein may create, based on the common property of the set of variants of the trusted software program, a signature that is capable of recognizing variants of the trusted software program. For example, at step 308 signature module 110 may, as part of computing device 202 and/or server 206 in FIGS. 2A-2B, create, based on the common property 210 of the set of program variants 208 of the trusted software program, a common property signature 214 capable of recognizing variants of the trusted software program.

The term "signature," as used herein, generally refers to any type or form of notation associated with a software program that may be used to identify a software program or file. A signature may be based on any of a variety of characteristics, including common attributes of variants of a software program (such as static strings or code segments), behavioral attributes (such as calling a specific operating system routine at identified points in the software program's operation), or network behavior (such as accessing network resources at specific points in the software program's operation).

Signature module 110 may create a signature based on one or more common properties of variants of the trusted software program in any suitable manner. For example, signature module 110 may create a signature by generating a signature hash capable of identifying variants in the set of variants of the trusted software program. The phrase "signature hash," as used herein, generally refers to any numeric or alphanumeric string generated by a hash function that may be used to identify variants of a software program. Since software program variants, by definition, are not identical, identifying variants of a software program using a signature hash may depend on applying the hash function to strings or code segments common to the variants.

In another example, signature module 110 may create a signature describing a behavioral property and/or a pattern of network communication common to variants of the trusted software program. While the use of signature hashes is the most commonly used method used by malware detection systems for identifying malware programs, using behavioral or network communication properties may, in some instances, be a more accurate or less computationally complex method for identifying software programs, particularly in the case of trusted software programs, where behavioral or network communication properties may be reliably known or verified by the software developer. In some examples, signature module 110 may apply methods used for creating computational or network behavior signatures capable of identifying malware programs when creating signatures for identifying variants of trusted software programs.

In some examples, the systems described herein may add the signature to a database that associates common property signatures with sets of variants of trusted software programs. For example, at step 308 signature module 110 may, as part of computing device 202 and/or server 206 in FIGS. 2A-2B, add common property signature 214 to trusted program data 122 in database 120 on server 206. In some examples, trusted program data 122 may be part of a "whitelist" for use by a malware detection system.

Figure 5A:
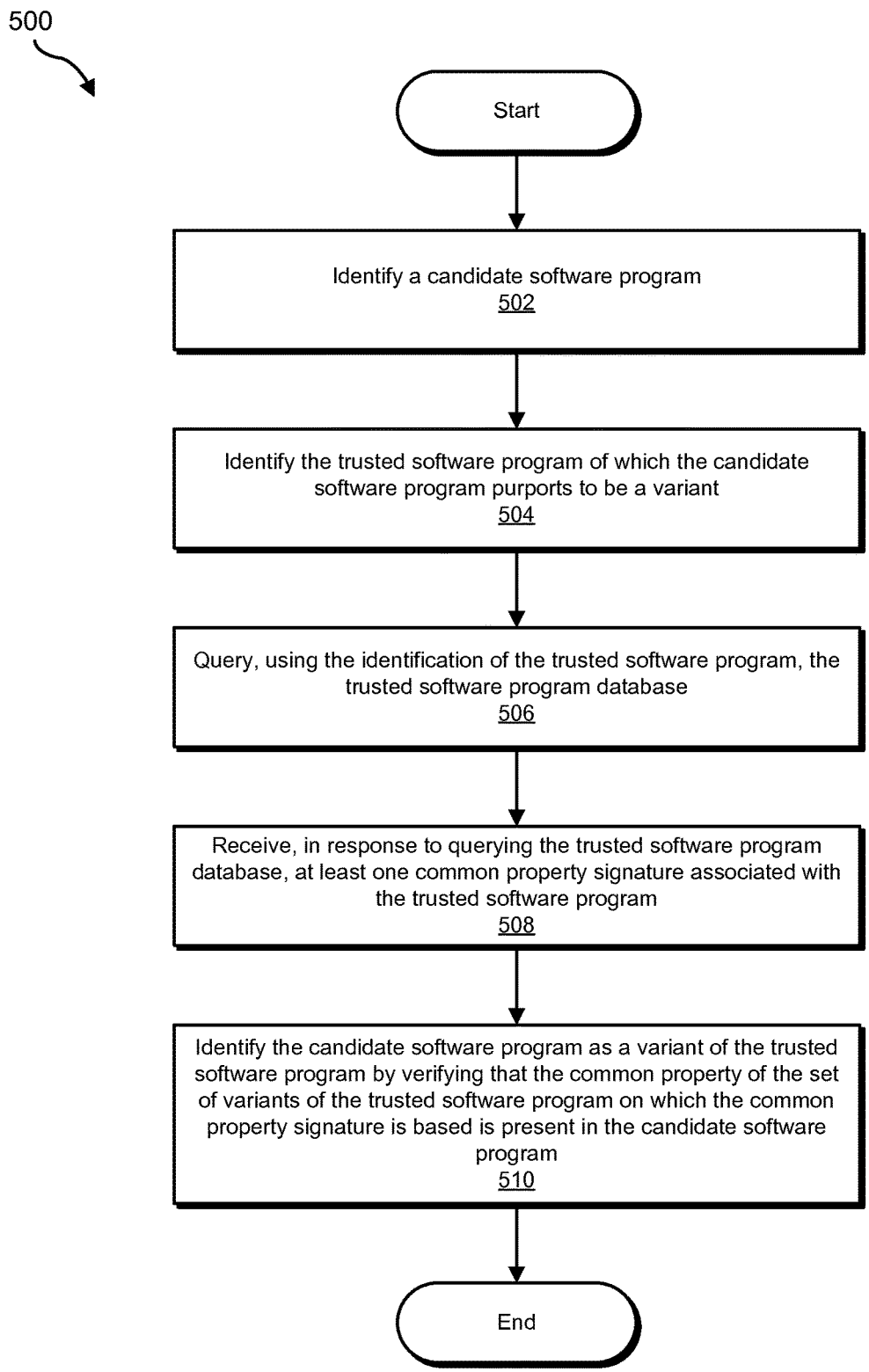
FIGS. 5A and 5B are flow diagrams of exemplary methods for identifying variants of a trusted software program.

In some embodiments, the systems described herein may identify a variant of a trusted software program as part of a malware scan of a data store by verifying that a software program tentatively identified as a trusted software program contains a common property of variants of the trusted program. FIG. 5A is a flow diagram of an exemplary method 500 for identifying variants of a trusted software program. At step 502 of FIG. 5A, one or more of the systems described herein may identify a candidate software program, and at step 504, identify the trusted software program of which the candidate software program purports to be a variant. For example, the candidate program may be tentatively identified as a trusted software program based on the file name or location in the directory structure of a data store.

At step 506 of FIG. 5A, database module 112 of FIGS. 2A-2B may query, using the tentative identification of the trusted software program, the trusted software program database 120 and, at step 508 of FIG. 5A, receive, in response to querying the trusted software program database 120, at least one common property signature associated with the trusted software program. Using the common property signature, signature module 110 of FIGS. 2A-2B may identify the candidate software program as a variant of the trusted software program by verifying that the common property of the set of variants of the trusted software program represented by the common property signature is present in the candidate software program. For example, the candidate program may be identified as a variant of the trusted software program by calculating a signature hash of strings or code segments in the candidate program and comparing the calculated signature hash to the signature hash associated with variants of the trusted software program.

Figure 5B:
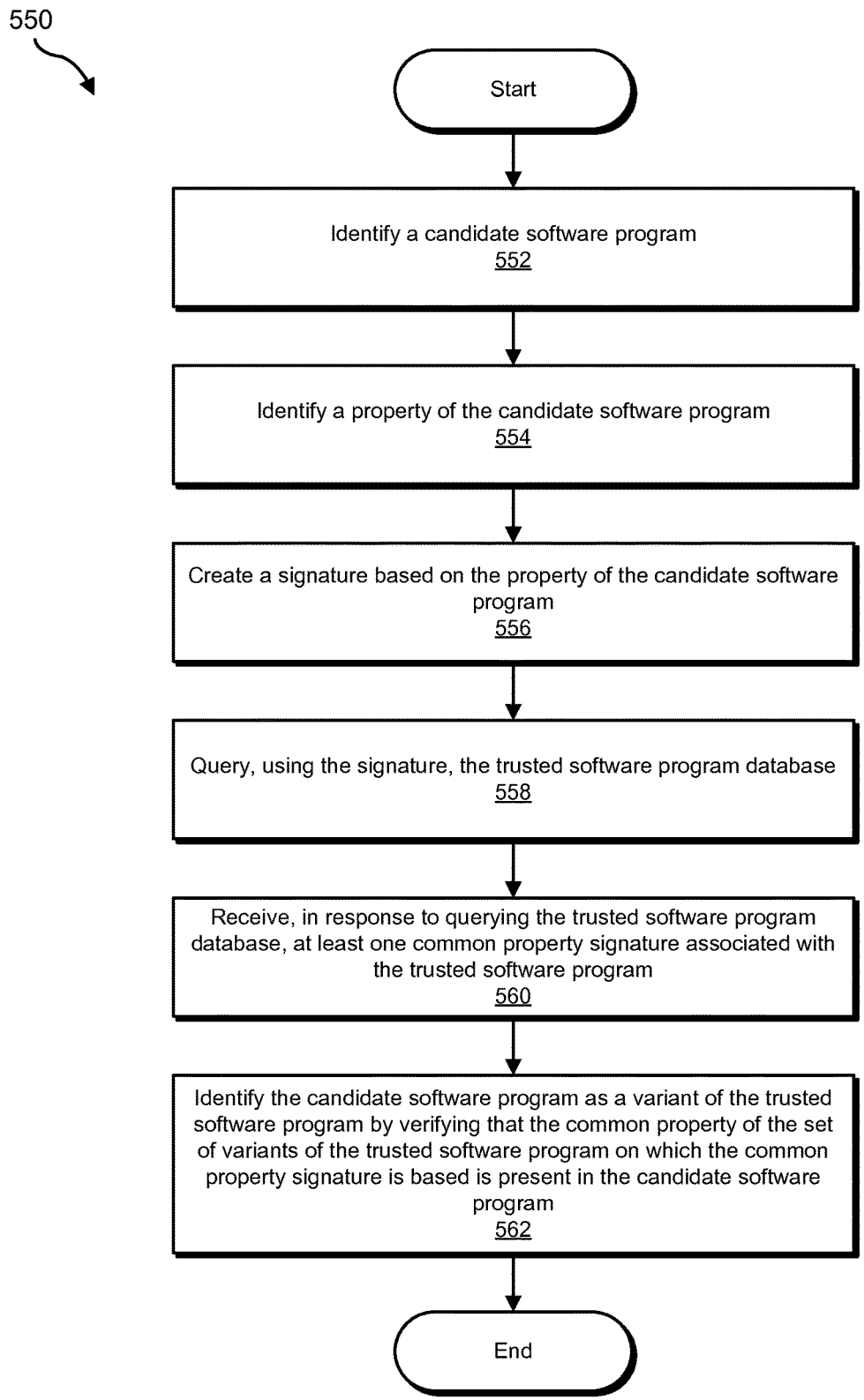

In other embodiments, the systems described herein may identify a variant of a trusted software program by creating a signature based on a property of a software program and verifying that the signature is a signature of a common property of variants of a trusted program. FIG. 5B is a flow diagram of an exemplary method 550 for identifying variants of a trusted software program. At step 552 of FIG. 5B, one or more of the systems described herein may identify a candidate software program, and at step 554 of FIG. 5B, identify a property of the candidate software program. At step 556 of FIG. 5B, signature module 110 of FIG. 2A may create a signature based on the property of the candidate software program. For example, signature module 110 may calculate a signature hash of strings or code segments present in the candidate software program.

At step 558 of FIG. 5B, database module 112 of FIGS. 2A-2B may query, using the calculated signature, trusted software program database 120, and at step 560, receive, in response to querying the trusted software program database 120, at least one common property signature associated with a trusted software program. At step 562 of FIG. 5B, signature module 110 may identify the candidate software program as a variant of the trusted software program by verifying that the common property of the set of variants of the trusted software program represented by the common property signature is present in the candidate software program.

As detailed above, the systems and methods described herein may prevent false positive malware identification in part by applying methods used for identifying malware to identifying trusted software programs. For example, by clustering variants of trusted programs based on common properties of variants of the software program, the systems and methods described herein may reduce the time and resources required to scan large data stores for malware and/or may reduce false positive malware identifications, which may require the time and attention of a user or administrator to resolve.

Furthermore, by generating a generic signature to describe a cluster of malware samples, these systems and methods may reduce the number of signatures necessary to provide anti-malware protection, potentially reducing the resources needed to propagate, store, and use signatures. Additionally, these systems and methods may efficiently cluster variants of trusted programs to minimize the computational complexity necessary to identify trusted program variants.

Figure 6:
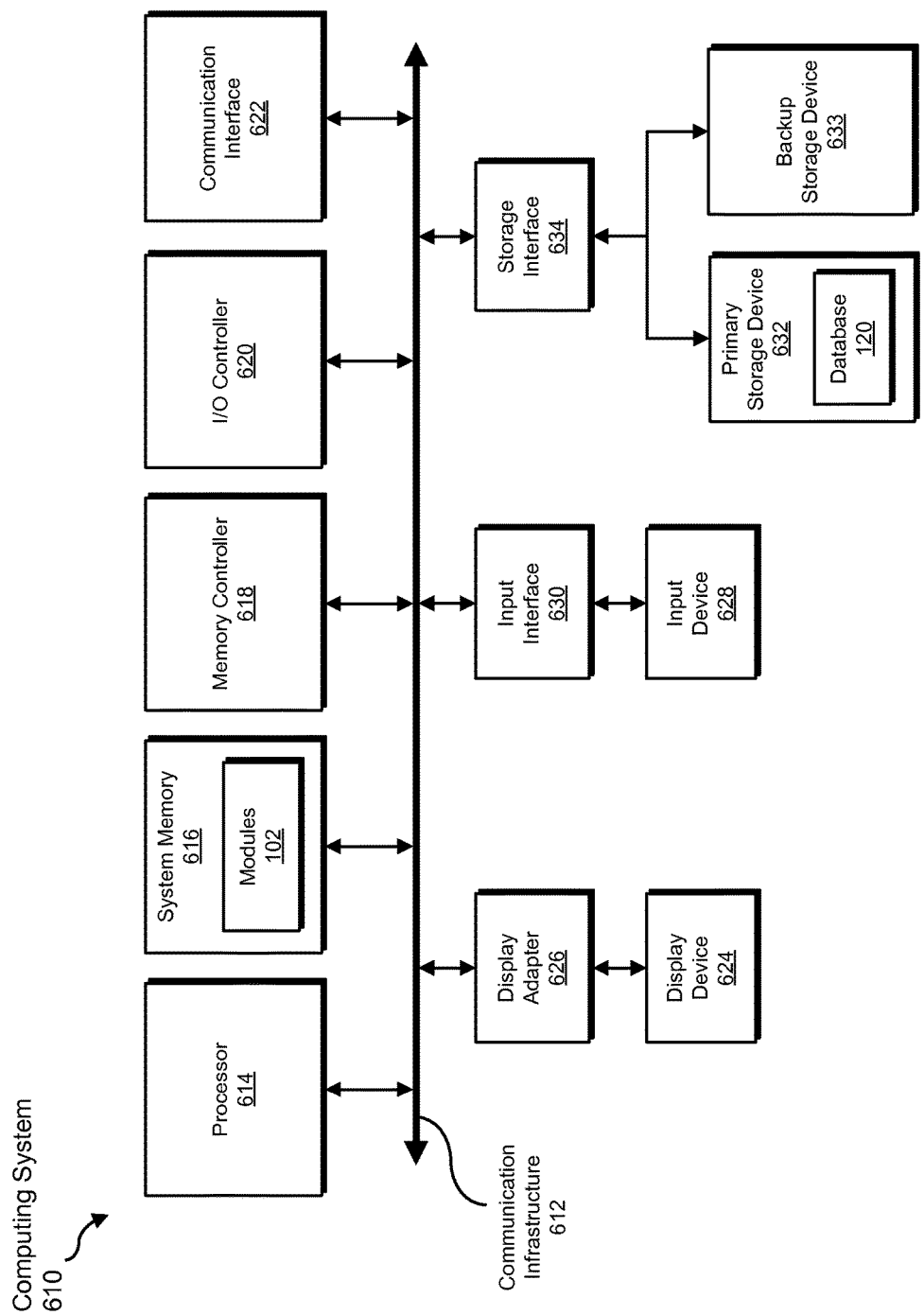
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
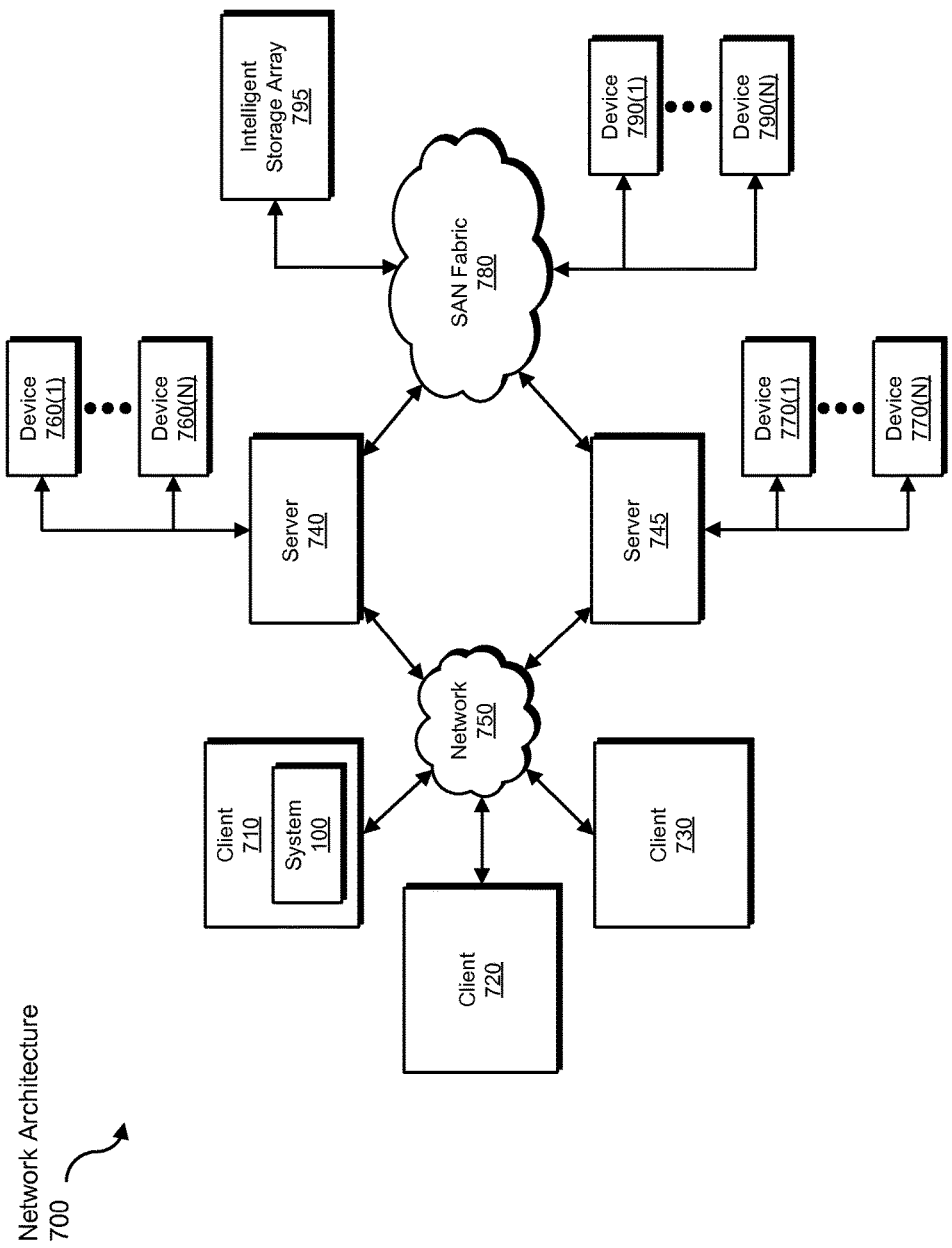
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for preventing false positive malware identification.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a computing system into a computing system for clustering variants of trusted software programs and/or analyzing software programs to identify variants of trusted software programs. As another example, one or more of the modules recited herein may receive variants of trusted software programs, transform the program variants to signatures capable of recognizing program variants, and use the result of the transformation to recognize variants of trusted software programs. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for preventing false positive malware identification, at least a portion of the method being performed by a computing device comprising at least one hardware processor, the method comprising:
    identifying a set of variants of a trusted software program obtained from a reputable source that differ from one another but originate from the same code base and are substantially identical in function;
    characterizing, for each variant in the set of variants of the trusted software program, at least one common property of the variants;
    clustering the set of variants of the trusted software program based on the common property of the variants;
    creating, based on the common property of the set of variants of the trusted software program, a generic signature that recognizes variants of the trusted software program;
    identifying, as part of a malware scan of a data store, a candidate software program that purports to be a variant of the trusted software program;
    determining, based on at least one of the file name of the candidate software program and the location of the candidate software program in a directory structure of the data store, that the candidate software program is potentially a trusted software program; and
    verifying that the candidate software program is a trusted software program by:
        determining that the common property of the set of variants of the trusted software program on which the generic signature is based is present in the candidate software program;
        identifying the candidate software program as a variant of the trusted software program based on the determination that the common property of the set of variants of the trusted software program is present in the candidate software program; and
        in response to identifying the candidate software program as a variant of the trusted software program, verifying that the candidate software program is a trusted software program.

2. The computer-implemented method of claim 1, wherein identifying the set of variants of a software program comprises at least one of:
    obtaining, from a software distributor, at least one variant in the set of variants of the trusted software program;
    obtaining, from the software distributor, a description of the common property of the variants of the trusted software program; and
    obtaining, from a community of software users, the set of variants of the trusted software program.

3. The computer-implemented method of claim 1, wherein the common property comprises at least one of:
    a static code segment;
    a behavioral property; and
    a pattern of network communication.

4. The computer-implemented method of claim 1, wherein characterizing the common property of each variant of the set of variants of the trusted software program comprises analyzing a subset of variants in the set of variants to identify the common property of the subset of variants.

5. The computer-implemented method of claim 4, wherein clustering the set of variants of the trusted software program comprises:
    verifying the presence of the common property in a variant that is in the set of variants, but not in the subset; and
    ascribing the common property to at least one variant that is in the set of variants, but not in the subset.

6. The computer-implemented method of claim 1, wherein creating the generic signature that recognizes variants of the trusted software program comprises at least one of:
    generating a signature hash capable of identifying variants of the trusted software program;
    describing a behavioral property capable of identifying variants of the trusted software program; and
    describing a pattern of network communication capable of identifying variants of the trusted software program.

7. The computer-implemented method of claim 1, further comprising adding the generic signature to a database that associates common property signatures with sets of variants of trusted software programs.

8. The computer-implemented method of claim 7, wherein identifying the candidate software program as a variant of the trusted software program comprises:
    querying, using an identifier of the trusted software program, the trusted software program database; and
    receiving, in response to querying the trusted software program database, the generic signature that recognizes variants of the trusted software program.

9. The computer-implemented method of claim 1, wherein determining that the common property of the set of variants is present in the candidate software program comprises:
    calculating a signature hash of at least one of strings in the candidate software program and code segments in the candidate software program; and comparing the calculated signature hash to a signature hash associated with the set of variants of the trusted software program.

10. A system for preventing false positive malware identification, the system comprising:
an identification module, stored in memory, that identifies a set of variants of a trusted software program obtained from a reputable source that differ from one another but originate from the same code base and are substantially identical in function;
a characterization module, stored in memory, that characterizes, for each variant in the set of variants of the trusted software program, at least one common property of the variants;
a clustering module, stored in memory, that clusters the set of variants of the trusted software program based on the common property of the variants;
a signature module, stored in memory, that creates, based on the common property of the set of variants of the trusted software program, a generic signature that recognizes variants of the trusted software program;
wherein the identification module:
identifies, as part of a malware scan of a data store, a candidate software program that supports to be a variant of the trusted software program;
determines, based on at least one of the file name of the candidate software program and the location of the candidate software program in a directory structure of the data store, that the candidate software program is potentially a trusted software program;
a verification module, stored in memory, that verifies that the candidate software program is a trusted software program by:
determining that the common property of the set of variants of the trusted software program on which the generic signature is based is present in the candidate software program;
identifying the candidate software program as a variant of the trusted software program based on the determination that the common property of the set of variants of the trusted software program on which the generic signature is based is present in the candidate software program; and
in response to identifying the candidate software program as a variant of the trusted software program, verifying that the candidate software program is a trusted software program; and
at least one hardware processor configured to execute the identification module, the characterization module, the clustering module, and the signature module.

11. The system of claim 10, wherein the identification module identifies the set of variants of the trusted software program by at least one of:
obtaining, from a software distributor, at least one variant in the set of variants of the trusted software program;
obtaining, from the software distributor, a description of the common property of the variants of the trusted software program; and
obtaining, from a community of software users, the set of variants of the trusted software program.

12. The system of claim 10, wherein the common property comprises at least one of:
a static code segment;
a behavioral property; and
a pattern of network communication.

13. The system of claim 10, wherein the characterization module characterizes the common property of each variant of the set of variants of the trusted software program by analyzing a subset of variants in the set of variants to identify at least one common property of the subset of variants.

14. The system of claim 13, wherein the clustering module clusters the set of variants of the trusted software program by:
verifying the presence of the common property in a variant that is in the set of variants, but not in the subset; and
ascribing the common property to at least one variant that is in the set of variants, but not in the subset.

15. The system of claim 10, wherein the signature module creates the generic signature that recognizes variants of the trusted software program by at least one of:
generating a signature hash capable of identifying variants in the set of variants of the trusted software program;
describing a behavioral property capable of identifying variants in the set of variants of the trusted software program; and
describing a pattern of network communication capable of identifying variants in the set of variants of the trusted software program.

16. The system of claim 10, further comprising a database module, stored in memory, that adds the generic signature to a database that associates common property signatures with sets of variants of trusted software programs.

17. The system of claim 16, wherein:
the identification module identifies the trusted software program of which the candidate software program purports to be a variant;
the database module queries, using the identification of the trusted software program, the trusted software program database; and
the database module receives, in response to querying the trusted software program database, at least one common property signature associated with the trusted software program.

18. The system of claim 16, wherein:
the characterization module identifies a property of the candidate software program;
the signature module creates a signature based on the property of the candidate software program;
the database module queries, using the signature, the trusted software program database; and
the database module receives, in response to querying the trusted software program database, at least one common property signature associated with a trusted software program.

19. A non-transitory computer-readable medium comprising one or more computer-executable instructions that, when executed by at least one hardware processor of a computing device, cause the computing device to:
identify a set of variants of a trusted software program obtained from a reputable source that differ from one another but originate from the same code base and are substantially identical in function;
characterize, for each variant in the set of variants of the trusted software program, at least one common property of the variants;
cluster the set of variants of the trusted software program based on the common property of the variants;
create, based on the common property of the set of variants of the trusted software program, a generic signature that recognizes variants of the trusted software program;

identify, as part of a malware scan of a data store, a candidate software program that purports to be a variant of the trusted software program;

determine, based on at least one of the file name of the candidate software program and the location of the candidate software program in a directory structure of the data store, that the candidate software program is potentially a trusted software program; and verify that the candidate software program is a trusted software program by:

determining that the common property of the set of variants of the trusted software program on which the generic signature is based in present in the candidate software program;

identifying the candidate software program as a variant of the trusted software program based on the determination that the common property of the set of variants of the trusted software program on which the generic signature is based is present in the candidate software program; and in response to identifying the candidate software program as a variant of the trusted software program, verifying that the candidate software program is a trusted software program.

20. The non-transitory computer-readable-storage medium of claim 19, wherein the one or more computer-executable instructions cause the computing device to identify the software program by at least one of:

obtaining, from a software distributor, at least one variant in the set of variants of the trusted software program;

obtaining, from the software distributor, a description of the common property of the variants of the trusted software program; and obtaining, from a community of software users, the set of variants of the trusted software program.

* * * * *